US012499276B2

(12) United States Patent
Cianci et al.

(10) Patent No.: US 12,499,276 B2
(45) Date of Patent: *Dec. 16, 2025

(54) DIGITAL SIGNATURE SYSTEM

(71) Applicant: Seal Pact, LLC, Farmington, CT (US)

(72) Inventors: Paul A. Cianci, Farmington, CT (US); Edgar N. Garcia, Waxhaw, NC (US)

(*) Notice: Subject to any disclaimer, the term of this patent is extended or adjusted under 35 U.S.C. 154(b) by 213 days.

This patent is subject to a terminal disclaimer.

(21) Appl. No.: 18/328,118

(22) Filed: Jun. 2, 2023

(65) Prior Publication Data

US 2023/0385435 A1    Nov. 30, 2023

Related U.S. Application Data

(63) Continuation-in-part of application No. 18/196,114, filed on May 11, 2023.

(Continued)

(51) Int. Cl.
| | |
|---|---|
| *G06F 21/64* | (2013.01) |
| *G06F 21/62* | (2013.01) |
| *G06K 19/06* | (2006.01) |
| *H04L 9/14* | (2006.01) |
| *H04L 9/32* | (2006.01) |

(52) U.S. Cl.
CPC ......... *G06F 21/64* (2013.01); *G06F 21/6209* (2013.01); *H04L 9/14* (2013.01); *H04L 9/3247* (2013.01); *G06K 19/06028* (2013.01); *G06K 19/06037* (2013.01); *H04L 2209/68* (2013.01)

(58) Field of Classification Search
CPC ......... G06F 21/64; H04L 9/3247; H04L 9/14; H04L 2209/68; G06K 19/06037
See application file for complete search history.

(56) References Cited

U.S. PATENT DOCUMENTS

| | | |
|---|---|---|
| 5,652,784 A | 7/1997 | Lepetit et al. |
| 5,850,219 A | 12/1998 | Kumomura |

(Continued)

FOREIGN PATENT DOCUMENTS

| | | |
|---|---|---|
| WO | 2001015382 A1 | 3/2001 |
| WO | 2009101478 A3 | 1/2010 |

(Continued)

OTHER PUBLICATIONS

Bo et al., "Electronic Seal Based on Hash Function and Digital Watermark." IEEE (2009): pp. 28-31.

(Continued)

*Primary Examiner* — Robert B Leung

(57) ABSTRACT

This disclosure introduces digital signature systems having dynamically validated, multi-level signature seals. An exemplary digital signature system includes a multi-level signature seal with an attestation and machine-readable code configured to direct a user, upon scanning or selecting the machine-readable code, to a validation portal for the attestation. The validation portal includes an artifact graphically indicating a current validation status of the attestation and a validation link configured to direct the user, upon selection, to multi-level signature data for the seal. A user dashboard is provided to allow the conveyor of the seal to manually validate and invalidate the attestation. The user dashboard includes a scans widget that, upon selection, directs a user to a scan details informational view for the seal.

20 Claims, 12 Drawing Sheets

Related U.S. Application Data

(60) Provisional application No. 63/347,216, filed on May 31, 2022.

(56) References Cited

U.S. PATENT DOCUMENTS

| | | | |
|---|---|---|---|
| 6,401,206 | B1 | 6/2002 | Khan et al. |
| 6,907,529 | B1 | 6/2005 | Hirose |
| 7,380,209 | B2 | 5/2008 | Cheng et al. |
| 7,523,315 | B2 | 4/2009 | Hougaard et al. |
| 7,548,665 | B2 | 6/2009 | Tredoux |
| 8,533,480 | B2 | 9/2013 | Pravetz et al. |
| 8,560,853 | B2 | 10/2013 | De Mello et al. |
| 8,924,307 | B2 | 12/2014 | Han et al. |
| 11,075,766 | B1* | 7/2021 | Norton .................. H04L 9/0819 |
| 11,186,111 | B1* | 11/2021 | Nagelberg ....... G06K 19/06037 |
| 2002/0129255 | A1 | 9/2002 | Tsuchiyama et al. |
| 2004/0015699 | A1 | 1/2004 | Thomas et al. |
| 2005/0125666 | A1 | 6/2005 | Lin |
| 2009/0006842 | A1* | 1/2009 | Ross ....................... H04L 63/12 713/155 |
| 2009/0006860 | A1 | 1/2009 | Ross |
| 2009/0031135 | A1 | 1/2009 | Kothandaraman |
| 2015/0188711 | A1 | 7/2015 | Kirgan et al. |
| 2015/0356306 | A1* | 12/2015 | Carter ..................... G06F 21/64 380/246 |
| 2016/0110827 | A1 | 4/2016 | Tweyman et al. |
| 2019/0068798 | A1* | 2/2019 | Segawa ................ G06F 3/1285 |
| 2019/0347888 | A1* | 11/2019 | Agbeyo ............... G07D 7/0043 |
| 2021/0091939 | A1* | 3/2021 | Jabourian ............ B42D 25/305 |
| 2022/0014390 | A1* | 1/2022 | Li ......................... H04L 9/3268 |

FOREIGN PATENT DOCUMENTS

| | | |
|---|---|---|
| WO | 2010046864 A1 | 4/2010 |
| WO | 2010143001 A1 | 12/2010 |
| WO | 2048867 B1 | 5/2012 |
| WO | 2015196256 A1 | 12/2015 |

OTHER PUBLICATIONS

Jian, Xu, and Ma Bin. "Digital watermark for document electronic seal system based on DCT technology." IEEE, vol. 2. (2011): pp. 5-8.

Park et al., "Visible watermarking using verifiable digital seal image." SCIS (2001): 7 pages.

Qu et al., "A New Approach for Digital Signature Based on Digital Seal." IISA, Academy Publisher (2009): p. 456-459.

Yu et al., "Dual function seal:visualized digital signature for electronic medical record systems." J Med Sys 36.5 (2012): 3115-3121.

* cited by examiner

SealPact ID: 206
0f9405f7b8fabc7dda4988017838c1e33ee6709dc26ff517ebf21b453a69a90

🖶 Print 410

| 1- Basic ⓘ | 2-Advanced ⓘ | 3-Quality Control ⓘ | 4-Contractual Info ⓘ | View Document |

402    412    414    408

Client Name
Sample Client
Client Email
sampleclient@gmail.com
Client Type
Commercial
Owner Type
InsuranceCompany
Nature of Work
Design
Discipline
civilEngineer
Concentration
Structural
Project Role
engineerRecord

404  404

Scope Inclusions
Sample Inclusions, x, y, z
Scope Exclusions
A, B
Have you retained sub-consultants for this project?
No
Sub-consultant Discipline
N/A
Sub-consultant Concentration
N/A

┌─────────────┐
│ ADDITIONAL  │ 406
│ INFORMATION │
└─────────────┘

SealPact ID:
0f9405f7b8fabc7dda49880178389c1e33ee6709dc26ff517ebf21b453a69a90

🖨 Print  1-Basic ⓘ | 2-Advanced ⓘ | 3-Quality Control ⓘ | 4-Contractual Info ⓘ    [View Document]

Fees
4000

Contract
Written

Upload Contract
2020-05-15 Sample.pdf

Whose Contract?
Design Professional's

Limit of Liability Amount
40000

Waiver of Consequential Damages
Yes

[ADDITIONAL INFORMATION]

FIG. 5

| SEALPACT | MY DOCUMENTS | | | | | | |
|---|---|---|---|---|---|---|---|
| | ALL SEALPACTED PENDING INVALIDATED (+) UPLOAD NEW DOCUMENT [🔍 SEARCH] PAUL ▾ | | | | | | |
| | SIGNER NAME | TYPE | PROJECT NUMBER | PROJECT ADDRESS | PROJECT NAME | DATE UPLOADED |
| MY DASHBOARD | PAUL CIANCI | SEAL | 22 123 01 | 123 MAIN ST. SAMPLETOWN, CT | SAMPLE PROJECT | 02/13/2022 |
| MY SEALS | PAUL CIANCI | STAMP | 20 001 01 | 1 | CONKLIN RESIDENCE | 02/07/2022 |
| | | SEAL | 20 001 01 | 1 | CONKLIN RESIDENCE | 02/07/2022 |
| MY DOCUMENTS | PAUL CIANCI | SIGNATURE | 20 001 01 | 1 | CONKLIN RESIDENCE | 02/07/2022 |
| | PAUL CIANCI | SIGNATURE | 20 001 01 | 1 | CONKLIN RESIDENCE | 02/07/2022 |
| MY ACCOUNT | ANGELA CIANCI | SEAL | 20 001 01 | 1 | CONKLIN RESIDENCE | 02/04/2022 |
| | PAUL CIANCI | STAMP | 20 001 01 | 1 CHATSWORTH PL | PAUL CIANCI | 02/04/2022 |
| SUBSCRIPTION | PAUL | SEAL | THANKS | 1 | CONKLIN RESIDENCE | 02/04/2022 |
| | PAUL CIANCI | SIGNATURE | 20 001 01 | 1 | CONKLIN RESIDENCE | 02/04/2022 |
| | PAUL CIANCI | SIGNATURE | 20 001 01 | 1 | CONKLIN RESIDENCE | 02/04/2022 |
| | PREVIOUS PAGE 1 OF 24 20 ROWS ▾ NEXT | | | | | |

FIG. 8

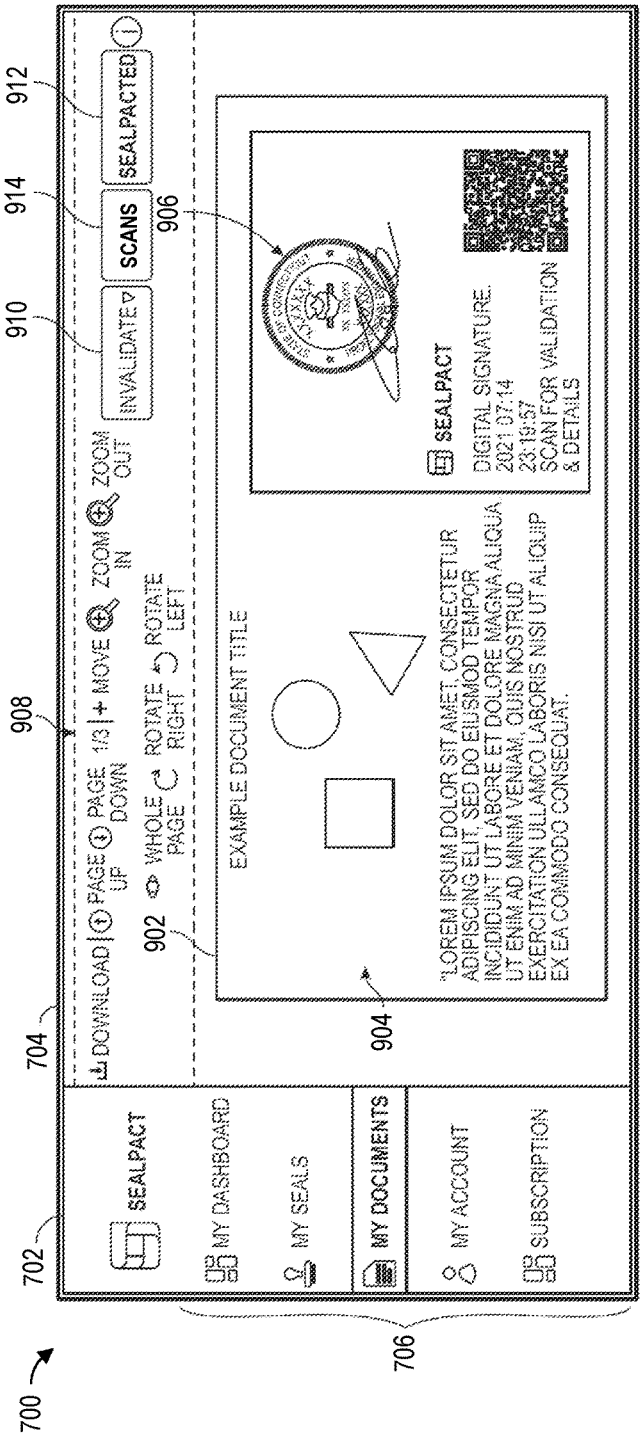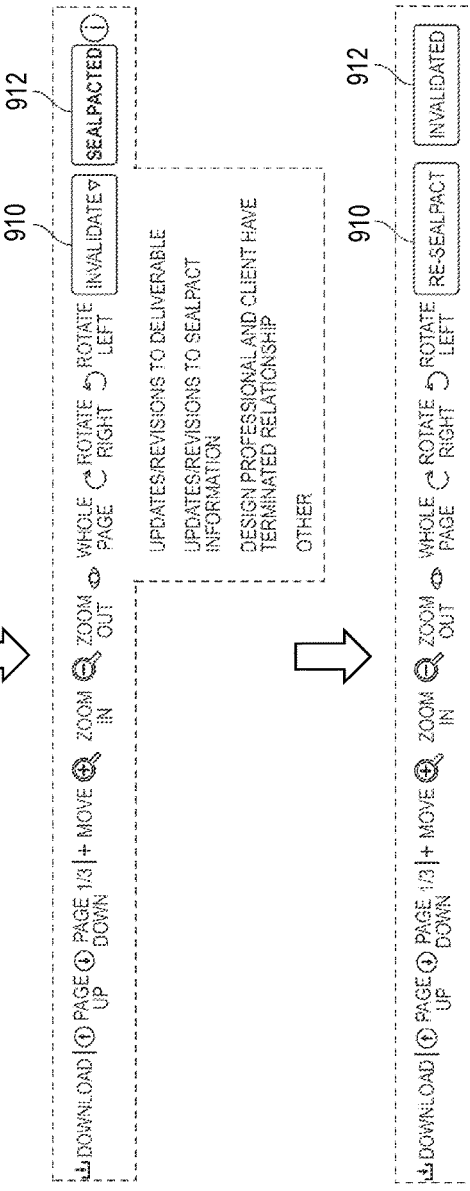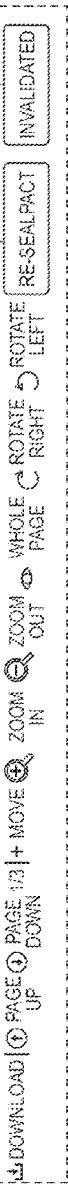
FIG. 9A
FIG. 9B
FIG. 9C

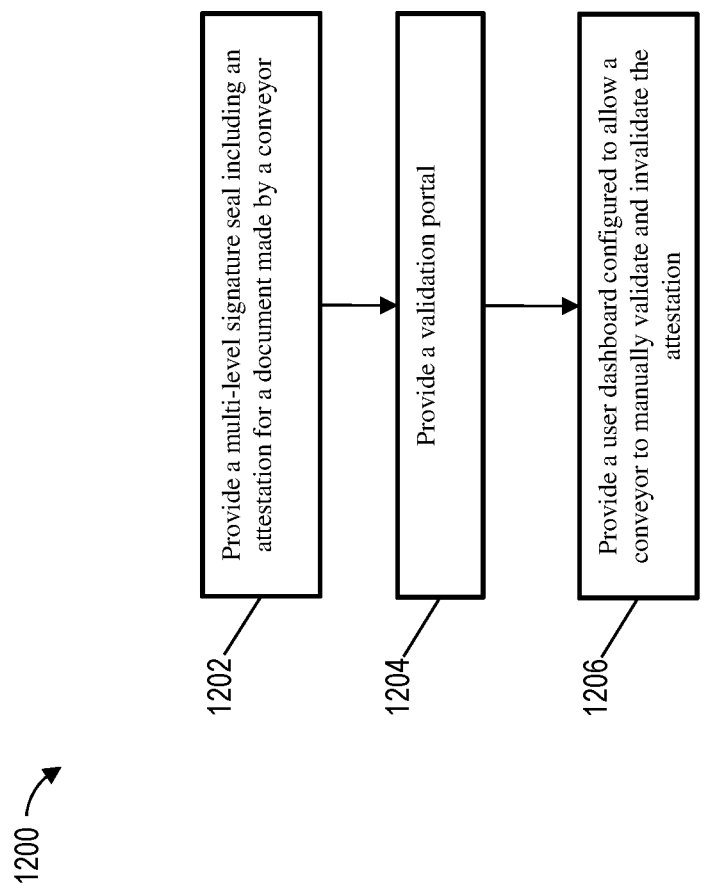

DIGITAL SIGNATURE SYSTEM

CROSS-REFERENCE TO RELATED APPLICATION(S)

This application claims the priority benefit of U.S. Provisional Application No. 63/347,216 filed on May 31, 2022, the disclosure of which is incorporated herein by reference for all purposes. This application is a continuation-in-part of U.S. application Ser. No. 18/196,114 filed on May 11, 2023, the disclosure of which is incorporated herein by reference for all purposes.

INTRODUCTION

The subject disclosure relates to credentialing and authentication systems, and particularly to a digital signature system having dynamically validated, multi-level signature seals.

The use of seals for protecting against fraud and tampering can be traced back to antiquity. Wax seals, for example, have been used by monarchs, administrators, bankers, and merchants for hundreds of years to protect official decrees, sensitive messages, ledgers, and contracts. The wax seal can be unique or otherwise attributable to the bearer and the presence of such a seal serves as a validation or attestation that the sealed document was in fact authored or certified by the bearer.

Equivalent techniques are still used today, although the wax seal has been largely replaced by physical seals made via embossing or stamping and by electronic seals made digitally, such as digital certificates. For example, professional engineers and architects can seal a drawing to indicate that the respective version or revision of the drawing is the final, approved version for construction. Notaries commonly stamp a range of documents as proof that a signature was officially witnessed. A website can include a digital certificate for a range of reasons, such as proof that stored user data is secure, to verify website ownership, and to prevent others from impersonating the website.

SUMMARY

Embodiments of the present invention are directed to a digital signature system having dynamically validated, multi-level signature seals. A non-limiting example digital signature system includes a multi-level signature seal with an attestation and machine-readable code configured to direct a user, upon scanning or selecting the machine-readable code, to a validation portal for the attestation. The validation portal includes an artifact graphically indicating a current validation status of the attestation and a validation link configured to direct the user, upon selection, to multi-level signature data for the seal. A user dashboard is provided to allow the conveyor of the seal to manually validate and invalidate the attestation. The user dashboard includes a scans widget that, upon selection, directs a user to a scan details informational view for the seal.

Other embodiments of the present invention implement features of the above-described system in computer implemented methods.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2A depicts a validation portal for the seal when the seal is valid;

FIG. 2B depicts the validation portal for the seal when the seal is invalid;

FIG. 4 illustrates a second page ("2-Advanced") of the multi-level digital signature validation portal in accordance with one or more embodiments;

FIG. 5 illustrates a third page ("4-Contractual Info") of the multi-level digital signature validation portal in accordance with one or more embodiments;

FIG. 8 illustrates an exemplary selectable field of the user interface according to one or more embodiments;

FIG. 9A illustrates an exemplary dashboard for a valid seal after selecting a document in the user interface according to one or more embodiments;

FIG. 9B illustrates an exemplary dashboard for invaliding the seal in the user interface according to one or more embodiments;

FIG. 9C illustrates an exemplary dashboard after invaliding the seal in the user interface according to one or more embodiments;

FIG. 12 is a flowchart in accordance with one or more embodiments.

DETAILED DESCRIPTION

Figure 1:
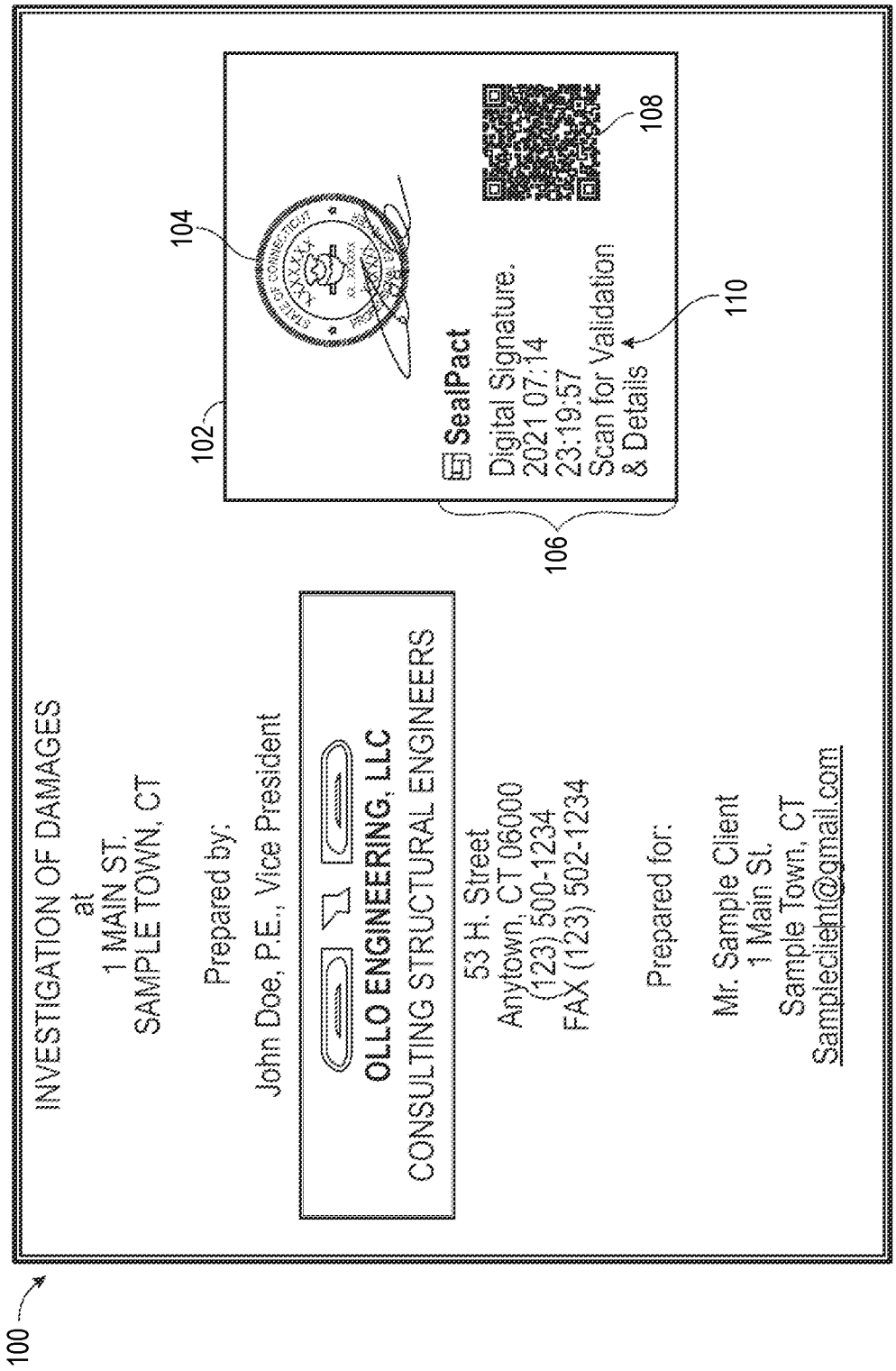
FIG. 1 depicts a document having a dynamically validated, multi-level signature seal according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Modern credentialing and authentication systems rely on the use of physical seals (stamped, embossed, wax, etc.) and digital seals (digital certificates, etc.) to verify and authenticate physical and digital documents and objects across a range of disciplines including notarization services, engineering, and banking. Unfortunately, there are some issues and limitations inherent to the types of physical and electronic seals currently available.

Physical seals are increasingly subjected to ever more sophisticated counterfeiting techniques. Given the ease of replicating a physical seal using modern equipment, strictly physical seals are becoming less trusted (and therefore less useful) for verifying the authorship or authenticity of a sealed document or object.

In the digital world, certificates and encryption keys have, in some ways, taken the place of physical seals to provide security and/or authenticity for digital documents, pages, programs, and other types of digital media. Traditional digital certificates and encryption keys, however, are static, single level signature objects (e.g., certificates serve as a type of snapshot validation for websites) that are not easily portable to the physical world (e.g., for securing printed documents).

One or more embodiments of the present invention address one or more of the above-described shortcomings by providing a digital signature system having dynamically validated, multi-level signature seals. Embodiments of the present invention provide a mechanism to allow a bearer to dynamically validate and invalidate their digital seals at any time and from any location. In some embodiments, a previously valid seal can be invalidated by the bearer and such invalidation will be dynamically passed to all documents and objects containing that respective seal.

Technical solutions described herein facilitate a range of improvements to credentialing and authentication technologies. As an initial matter, a digital seal system that allows for dynamic validations and invalidations according to one or more embodiments greatly simplifies current credentialing approaches which, for example, typically require new seals to be issued following an invalidation. Moreover, the digital seal itself is configured according to one or more embodiments as a multi-level signature rather than a single-level signature common to traditional digital certificates.

In particular, the digital seal directs a user, upon selection of the seal in the digital space (or by scanning a QR code incorporated within the seal in the physical space), to a validation portal where the user can easily see the current validation status of the seal (i.e., whether the seal remains valid or whether the seal has been invalidated post-issuance) and if valid, also provides an option to check the single-level signature of the seal. A single-level signature includes, for example, a Public Key Infrastructure (PKI) signature stored on a blockchain. If invalid, verification of the single-level signature is blocked. The validation portal also includes supplementary information, such as the validation history of the seal, the reason(s) for invalidations, etc., as well as a link to multi-level signature data. As used herein, "multi-level signature" data refers to static variables and dynamic variables digitally attached to the seal. Static variables and dynamic variables are discussed is greater detail herein, but generally refer to multi-level digital signature information that cannot be updated after digitally signing/sealing (static) and multi-level digital signature information that can be updated after digitally signing/sealing (dynamic).

FIG. 1 illustrates a document 100 having a dynamically validated, multi-level signature seal 102 according to one or more embodiments. As shown in FIG. 1, the seal 102 can include various structural elements, such as, for example, an attestation 104, seal details 106, and machine-readable code 108. Although the document 100 and seal 102 are shown in a particular configuration for ease of discussion and illustration, it should be understood that the actual content of the document 100 and the seal 102 can vary depending on the needs of the respective application.

The attestation 104 can include a certification, stamp, and/or seal from a bearer of the seal 102 for the document 100 and can be signed or unsigned by the bearer. Like the wax seal from antiquity, the attestation 104 serves as an easily observable accreditation from the bearer for the contents of the document 100. In some embodiments, the attestation 104 includes a license number or other identifier for the bearer of the seal 102.

Figures 2A, 2B:
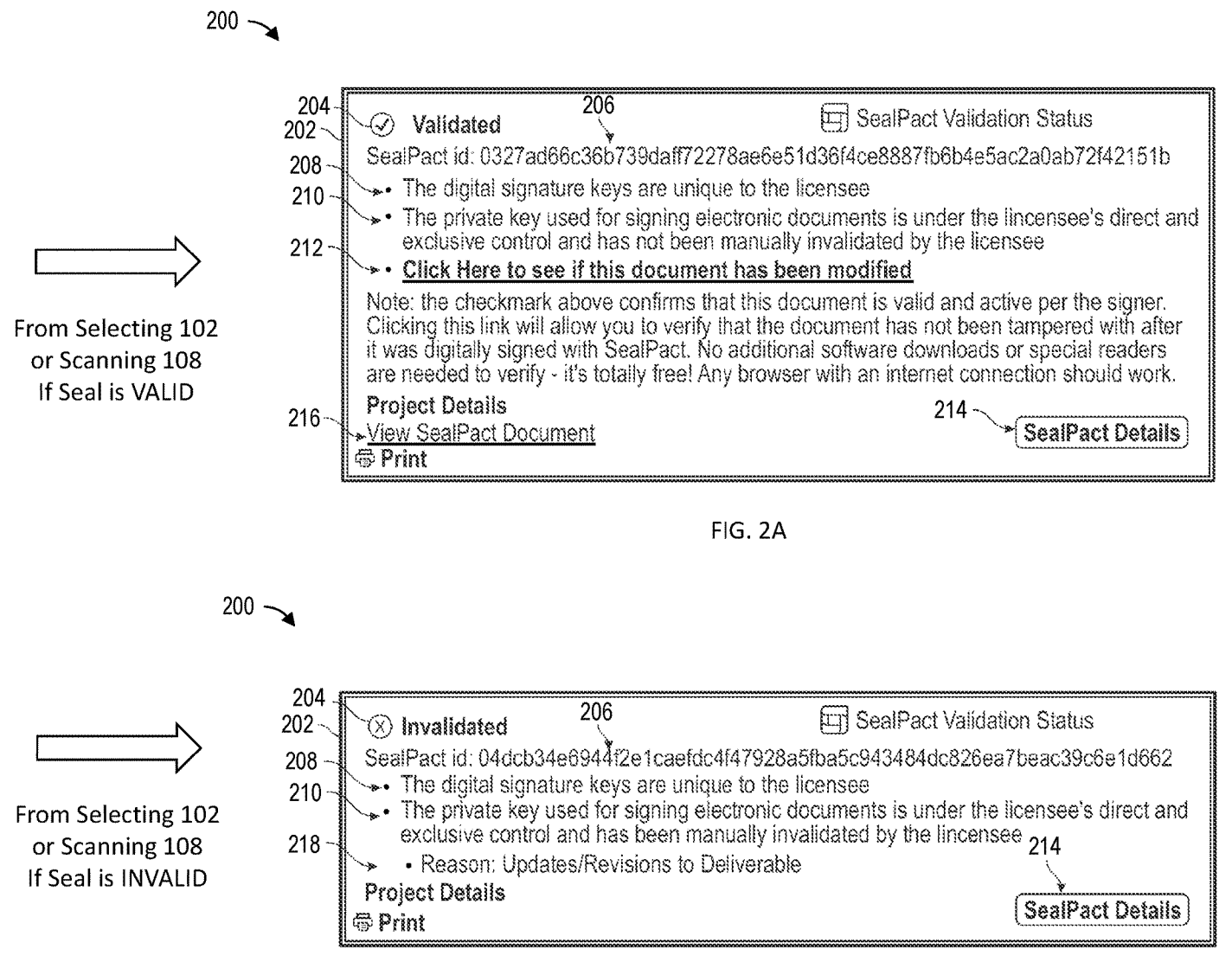

The seal details 106 can include information related to the attestation 104 and/or the seal 102. In some embodiments, the seal details 106 can provide the name of the bearer of the seal 102, a timestamp indicating the time that the attestation 104 was made, metadata for the seal 102 itself such as, for example, the name of the company responsible for maintaining the seal 102 multi-level signature data, and a link 110. In some embodiments, selecting the link 110 directs the user to a validation portal (e.g., validation portal 200 in FIGS. 2A and 2B) where the user can easily see the current validation status of the seal 102. In some embodiments, the seal 102 is configured to directly serve as the link 110. In other words, selecting any area within the boundaries of the seal 102 can direct the user to the validation portal. Validation portals are discussed in greater detail with respect to FIGS. 2A and 2B. FIG. 2A depicts a validation portal 200 when the seal 102 is valid, and FIG. 2B depicts the validation portal 200 when the seal 102 is invalid.

The machine-readable code 108 can include, for example, a barcode or a quick response (QR) code (as shown). In some embodiments, the machine-readable code 108 includes the link 110. In some embodiments, scanning the machine-readable code 108 directs the user to the validation portal in a similar manner as selecting the link 110. In this manner, the seal 102 can be easily validated by a user even if the document 100 (and the seal 102) is printed out or is otherwise made available in physical form. Although depicted as a QR code for ease of illustration, in some embodiments of the invention, the machine-readable code 108 does not include a barcode, QR code, etc., but is rather code embedded within the seal 102 itself. In this manner, any portion of the seal 102 (e.g., the attestation 104, the seal details 106, whitespace within the seal 102, and/or any other region of the seal 102) can be clicked to direct the user to the validation portal in a similar manner as selecting the link 110.

FIGS. 2A and 2B illustrate a validation portal 200 reached by clicking or selecting the link 110 (or seal 102 itself) and/or scanning the machine-readable code 108 shown in FIG. 1. Although the validation portal 200 is shown in a particular configuration and as having specific elements for ease of discussion and illustration, it should be understood that the actual content of the validation portal 200 can vary depending on the needs of the respective application. For example, the validation portal 200 can include more, or less elements than shown in FIGS. 2A and 2B.

FIG. 2A depicts the validation portal 200 when the seal (e.g., seal 102) is valid. In some embodiments, the validation portal 200 is a website or webpage that the user is automatically directed to (via, e.g., embedded URLs in the link 110) upon selection of the link 110 and/or via scanning the machine-readable code 108. In some embodiments, the validation portal 200 is configured as a pop-up window in a user interface used to interact with the document 100. The pop-up window can be automatically triggered upon selection of the link 110 (via, e.g., code embedded in the seal 102 and/or link 110).

As shown in FIG. 2A, the validation portal 200 includes a validation status window 202 (here, "SealPact Validation Status"). In some embodiments, the validation status window 202 includes an artifact 204 graphically indicating the validation status of the respective seal (e.g., seal 102). In some embodiments, the artifact 204 is configured as a check mark (as shown), thumbs up, smile emoji, or other graphical object that is easily recognizable as a positive indication that the respective seal is a valid seal.

As further shown in FIG. 2A, the validation status window 202 can include an identifier 206 for the seal 102. The identifier 206 can include a uniquely identifiable digital key, name, string, or sequence of symbols or alphanumeric characters for the seal 102. In some embodiments, the identifier 206 is a cryptographically protected (via, e.g., hashing, public and private keys, etc.) identifier.

In some embodiments, the validation status window 202 includes a single-level digital signature 208. The single-level digital signature 208 includes a first level of authentication information for the seal 102. In some embodiments, the single-level digital signature 208 includes a statement or status indicating that the identifier 206 (e.g., digital signature keys) is unique to the licensee indicated on the seal 102. Alternatively, if the identifier 206 is not unique to the licensee, the single-level digital signature 208 can include a statement or status indicating such. In some embodiments, the single-level digital signature 208 includes a statement or status indicating that the document 100 has not been (or has been) altered subsequent to the application of the seal 102. For example, the seal 102 can be configured such that any editing of the document 100 after placement of the seal 102 triggers the seal 102 to automatically update the respective message in the single-level digital signature 208 to warn users that the document 100 has been altered.

In some embodiments, the validation status window 202 includes multi-level validation information 210 corresponding to multi-level digital signature data for the seal 102. For example, multi-level validation information 210 can include a statement or status indicating that the private key used for signing electronic documents with the seal 102 is under the licensee's direct and exclusive control and the seal 102 has not been (or has been) manually invalidated by the licensee. The content of the multi-level digital signature data is discussed in greater detail below.

In some embodiments, the validation status window 202 includes a single-level signature validation link 212 when the seal 102 is valid (i.e., as shown in FIG. 2A). In some embodiments, selecting the single-level signature validation link 212 directs the user to a resource (via popup, website or webpage redirects, etc.) that allows the user to manually verify the single-level digital signature 208 (e.g., that the document 100 hasn't been tampered with) using, for example, a remotely accessed resource secured via a Secure Hash Algorithm (SHA). In some embodiments, selecting the single-level signature validation link 212 directs the user to a verification pop-up window (not separately shown) configured such that the user can choose a file or drag a file to the verification pop-up window to have the respective file validated (e.g., via SHA).

In some embodiments, the validation status window 202 includes a multi-level signature validation link 214 (here, "View SealPact Details"). In some embodiments, selecting the multi-level signature validation link 214 directs the user to a multi-level digital signature portal (e.g., the multi-level digital signature validation portal 300) via a popup, website or webpage redirect, etc., that allows the user to manually verify multi-level digital signature data for the document 100 and/or the seal 102. For example, selecting the multi-level signature validation link 214 can direct the user to one or more of FIGS. 3, 4, 5, and 6, the contents of which are discussed in greater detail below.

In some embodiments, the validation status window 202 includes a live link 216 to the underlying document itself (e.g., document 100) when the seal 102 is valid (i.e., as shown in FIG. 2A).

In some embodiments, interacting with the validation portal 200 (e.g., selecting the single-level signature validation link 212, the multi-level signature validation link 214, the live link 216, clicking anywhere within the validation portal 200, etc.) directs the user (via, e.g., a pop-up or browser redirect) to a subscription window (not separately shown). In some embodiments, the subscription window allows the user to register to receive updates on edits to the respective document/project (e.g., document 100). In some embodiments, the user can register within the subscription window by providing the user's email address (or other contact details, as desired). The subscription window can be served to users regardless of the current validation status of the seal 102.

FIG. 2B depicts the validation portal 200 when the seal (e.g., seal 102) is invalid. The validation portal 200 can include a validation status window 202, an artifact 204, an identifier 206, a single-level digital signature 208, a multi-level validation information 210, and a multi-level signature validation link 214, configured in a same or similar manner as discussed with respect to FIG. 2A. Notably, in some embodiments, the validation status window 202 does not include a single-level signature validation link 212 when the seal 102 is invalid (i.e., as shown in FIG. 2B). Similarly, in some embodiments, the validation status window 202 does not include a live link 216 to the underlying document itself (e.g., document 100) when the seal 102 is invalid (i.e., as shown in FIG. 2B).

As shown in FIG. 2B, the artifact 204 graphically indicates that the respective seal (e.g., seal 102) is not valid. In some embodiments, the artifact 204 is configured as an "X" mark (as shown), thumbs down, frown emoji, or other graphical object that is easily recognizable as an indication that the respective seal is no longer valid. In some embodiments, the validation status window 202 is configured to visually highlight one or more reasons for the invalid status. For example, the text associated with the single-level digital signature 208 and/or multi-level validation information 210 can be highlighted, changed in color, bolded, underlined, or otherwise altered to direct a user's attention to the reason(s) for the invalid status. As shown in FIG. 2B, the seal 102 is invalid because it was manually invalidated by the licensee. This example is merely explanatory of course, and it should be understood that seals can be invalidated for a variety of reasons (e.g., digital keys are compromised, document has been altered, revised, etc., licensee does not have direct and/or exclusive control of the private key, licensee has revoked/suspended license, or for any other reason). In some embodiments, the validation status window 202 includes supplementary information 218 attached to the reason(s) for invalidation, such as, for example, a statement that the licensee manually invalidated the seal 102 due to an update or revision change in the underlying deliverable (e.g., document 100).

Figure 3:
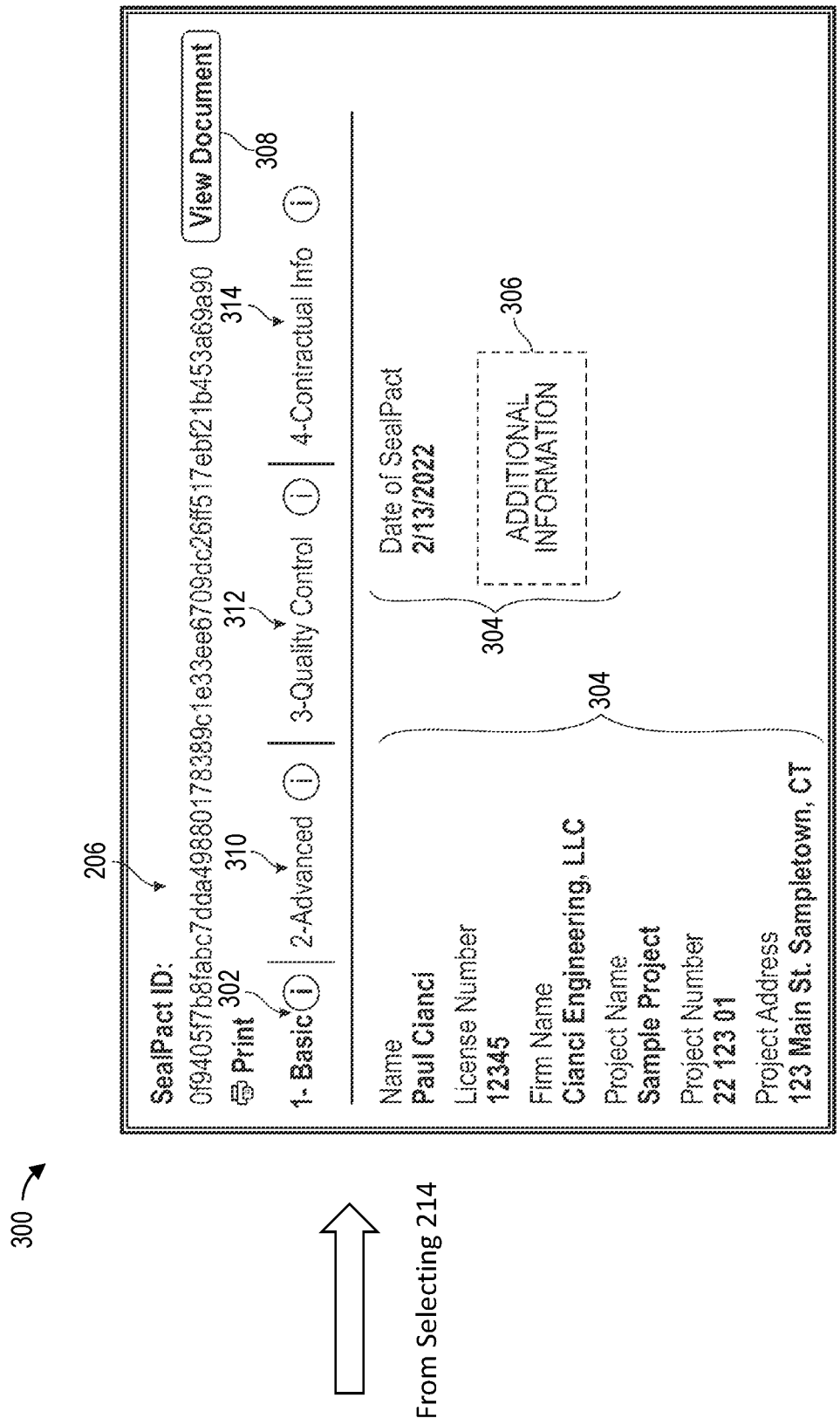
FIG. 3 illustrates a first page ("1-Basic") of a multi-level digital signature validation portal reached by clicking or selecting a multi-level signature validation link in accordance with one or more embodiments.

FIG. 3 illustrates a first page 302 (here, "1-Basic") of a multi-level digital signature validation portal 300 reached by clicking or selecting the multi-level signature validation link 214 shown in FIGS. 2A and 2B. Although the validation portal 300 is shown in a particular configuration and as having specific elements for ease of discussion and illustration, it should be understood that the actual content and arrangement of elements of the validation portal 300 can vary depending on the needs of the respective application. For example, various elements of the validation portal 300 shown in FIG. 3 can instead be located within the other pages (views) depicted in FIGS. 4, 5, and 6 (and vice versa). Moreover, the actual number and ordering of the various pages or views of the multi-level digital signature validation portal 300 can be arbitrarily changed or customized as desired for a particular application (e.g., which page is designated the "first" page or landing upon selecting the multi-level signature validation link 214 can be changed as desired, how elements are allocated between the various pages, how many pages, etc.).

As shown in FIG. 3, the first page 302 includes basic information 304 associated with the seal 102. As used herein, "basic" information includes information that is already available in the source document (e.g., document 100). For example, the basic information 304 can include the name of the licensee, the license number, the firm name associated with the licensee, a project name, a project number, a project address, a timestamp or a date indicating the time that the seal 102 was made, and/or any other additional information 306 already available in the source document. In some embodiments, the "basic" information is static information. As used herein, "static information" refers to information that cannot be changed by the signer or other users after the seal 102 is signed (i.e., after attestation). Advantageously, the basic information 304 provided in the first page 302 serves as a verified source of data against which a user can manually compare to information found in the document 100. This is useful, for example, when the document 100 has been printed or photocopied. In this manner, the user can ensure that no one has altered the information found in the document 100.

In some embodiments, the first page 302 includes one or more navigation link(s), such as the link 308 (here, "View Document"), link 310 ("2-Advanced"), link 312 ("3-Quality Control"), and link 314 ("4-Contractual Info"). In some embodiments, selecting the link 308 directs the user to the underlying document (e.g., document 100 as shown in FIG. 1). In some embodiments, selecting the links 310, 312, and 314 directs the user to the associated page of the multi-level digital signature validation portal 300 (e.g., FIGS. 4, 5, and 6, receptively).

FIG. 4 illustrates a second page 402 (here, "2-Advanced") of the multi-level digital signature validation portal 300. As shown in FIG. 4, the second page 402 includes advanced information 404 associated with the seal 102. As used herein, "advanced" information includes information that is not already available in the source document (e.g., document 100). In some embodiments, the "advanced" information is static information. As used herein, "static information" refers to information that cannot be changed by the signer or other users after the seal 102 is signed (i.e., after attestation).

In some embodiments, the advanced information 404 includes a client name, client email, client type, owner type, nature of work, disciple, concentration, project role, scope inclusions, scope exclusions, identifiers for retained sub-consultants, sub-consultant disciplines, sub-consultant concentrations, and/or any other additional information 406 that is not already available in the source document. Advantageously, the advanced information 404 serves as a verified supplemental source of data for the user. This is useful, for example, when the user is interested in the scope of liability (e.g., are there scope inclusion or exclusions?) associated with the seal 102 or in other supplemental information that is not typically included within the four corners of the document 100 (i.e., information that is not found within the physical copy of the document 100).

In some embodiments, the second page 402 includes one or more navigation link(s), such as the link 408 (here, "View Document"), link 410 ("1-Basic"), link 412 ("3-Quality Control"), and link 414 ("4-Contractual Info"). In some embodiments, selecting the link 408 directs the user to the underlying document (e.g., document 100 as shown in FIG. 1). In some embodiments, selecting the links 410, 412, and 414 directs the user to the associated page of the multi-level digital signature validation portal 300 (e.g., FIGS. 3, 5, and 6, receptively).

FIG. 5 illustrates a third page 502 (here, "4-Contractual Info") of the multi-level digital signature validation portal 300. As shown in FIG. 5, the third page 502 includes contractual information 504 associated with the seal 102. As used herein, "contractual" information includes information associated with the one or more contracts associated with the document 100 that is not already available in the source document (e.g., document 100). In some embodiments, the "contractual" information is static information. As used herein, "static information" refers to information that cannot be changed by the signer or other users after the seal 102 is signed (i.e., after attestation).

In some embodiments, the contractual information 504 includes a fee amount, a contract type, an uploaded contract link (e.g., a URL link to the respective contract), an identifier for the contract drafter, limits of liability, identifiers indicating whether there are waivers of consequential damages, and/or any other additional information 506 that is not already available in the source document. Advantageously, the contractual information 504 serves as a verified supplemental source of contractual data for the user, in a similar manner as the additional information 406 provides additional details as discussed with respect to FIG. 4.

In some embodiments, the third page 502 includes one or more navigation link(s), such as the link 508 (here, "View Document"), link 510 ("1-Basic"), link 512 ("2-Advanced"), and link 514 ("3-Quality Control"). In some embodiments, selecting the link 508 directs the user to the underlying document (e.g., document 100 as shown in FIG. 1). In some embodiments, selecting the links 510, 512, and 514 directs the user to the associated page of the multi-level digital signature validation portal 300 (e.g., FIGS. 3, 4, and 6, receptively).

Figure 6:
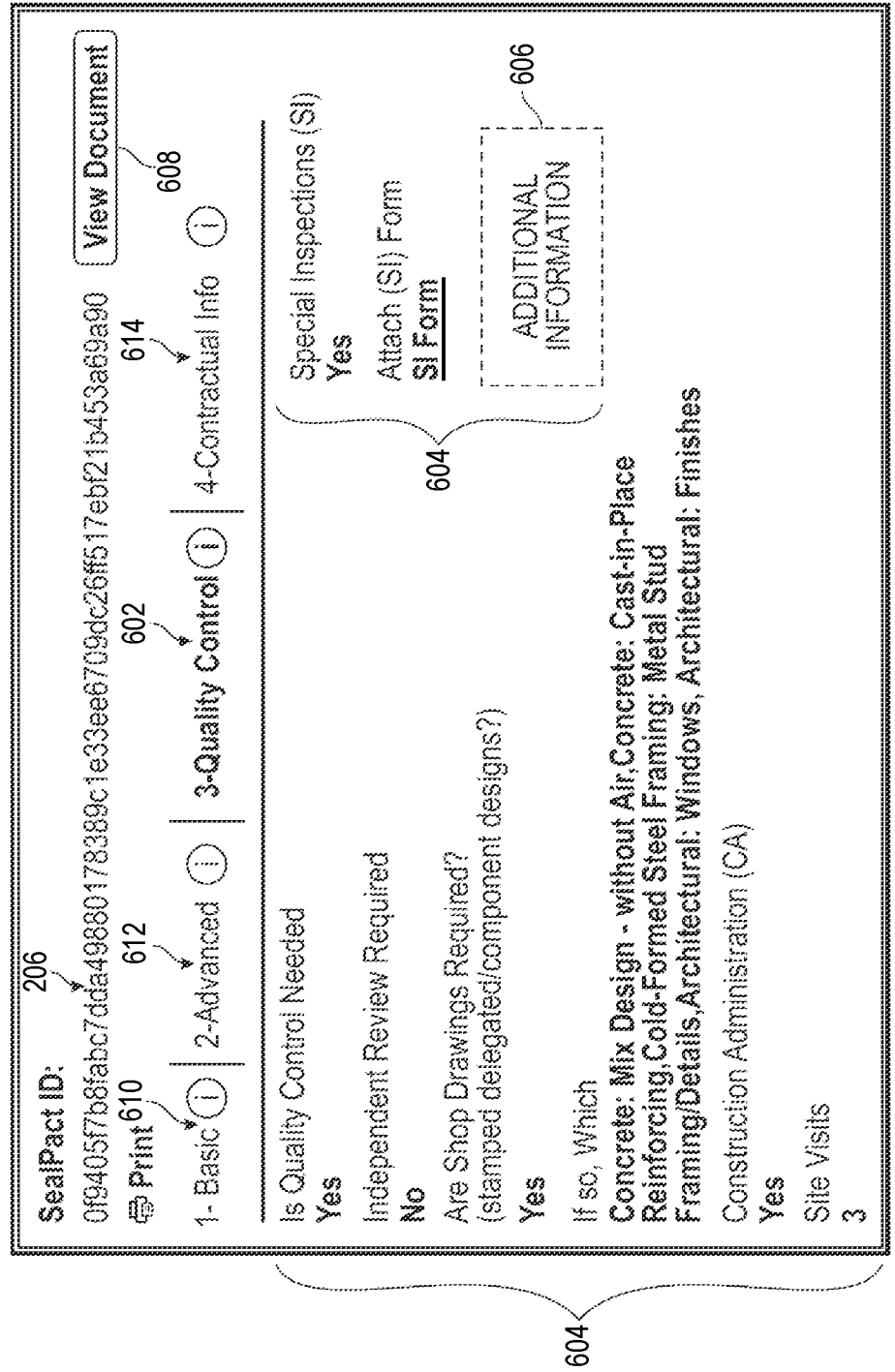
FIG. 6 illustrates a fourth page ("3-Quality Control") of the multi-level digital signature validation portal in accordance with one or more embodiments.

FIG. 6 illustrates a fourth page 602 (here, "3-Quality Control") of the multi-level digital signature validation portal 300. As shown in FIG. 6, the fourth used herein, "quality control" information includes dynamic information associated with the seal 102 that is not already available in the source document (e.g., document 100). As used herein, "dynamic information" refers to information that can be changed or otherwise updated by the signer (or other users) after the seal 102 is signed (i.e., after attestation). For example, dynamic information can be changed or updated in a means to track construction progress, proficiency, and adequacy of the project for the subject (original) sealed artifact.

In some embodiments, the quality control information 604 includes an indicator for whether quality control is needed for the respective seal (e.g., seal 102), an indicator for whether independent review is required (as shown, "No"; however, this field can also indicate that independent review is required, e.g., "Yes", and if so, whether it is completed or not, e.g., "Yes—Complete/Not Complete"), an indicator for whether shop drawings are required (for, e.g., stamped delegated and/or component designs) and if so, an indicator for which (here, Concrete: Mix Design—without Air, Concrete: Cast-in-Place Reinforcing, Cold-Formed Steal Framing: Metal Stud Framing/Details, Architectural: Windows, Architectural: Finishes, etc.), an indicator for whether a construction administration (CA) has been assigned to the respective matter, and if so, an indicator for a number of site visits made by the CA (here, "3"), an indicator for special instructions (SA), a link to any such SI forms, and/or any other additional information 606 that is not already available in the source document. Advantageously, the quality control information 604 serves as a verified source of dynamic information for the user.

In some embodiments, the fourth page 602 includes one or more navigation link(s), such as the link 608 (here, "View Document"), link 610 ("1-Basic"), link 612 ("2-Advanced"), and link 614 ("4-Contractual Info"). In some embodiments, selecting the link 608 directs the user to the underlying document (e.g., document 100 as shown in FIG. 1). In some embodiments, selecting the links 610, 612, and 614 directs the user to the associated page of the multi-level digital signature validation portal 300 (e.g., FIGS. 3, 4, and 5, receptively).

In contrast to the static information discussed previously with respect to FIGS. 3, 4, and 5, the dynamic information of the quality control information 604 is configured to change automatically or manually when necessary. In some embodiments, dynamic fields are linked to one or more external data sources. In some embodiments, dynamic fields are configured to continuously or periodically (at any interval set by the user) poll their respective external data source and can update automatically when the underlying information changes. For example, if the CA makes another site visit, the "Site Visits" field can automatically update to "4" by pulling site visit data from a linked external source. In another example of the dynamic nature of the quality control information 604, the link to the SI form shown in the quality control information 604 ("Attach (SI) Form—linked SI Form") can be configured as a dynamic hyperlink (e.g., URL) to the respective source for the SI form. In some embodiments, the quality control information 604 can be configured to dynamically updated the hyperlink when and if the source destination for the SI form changes.

Figure 7:
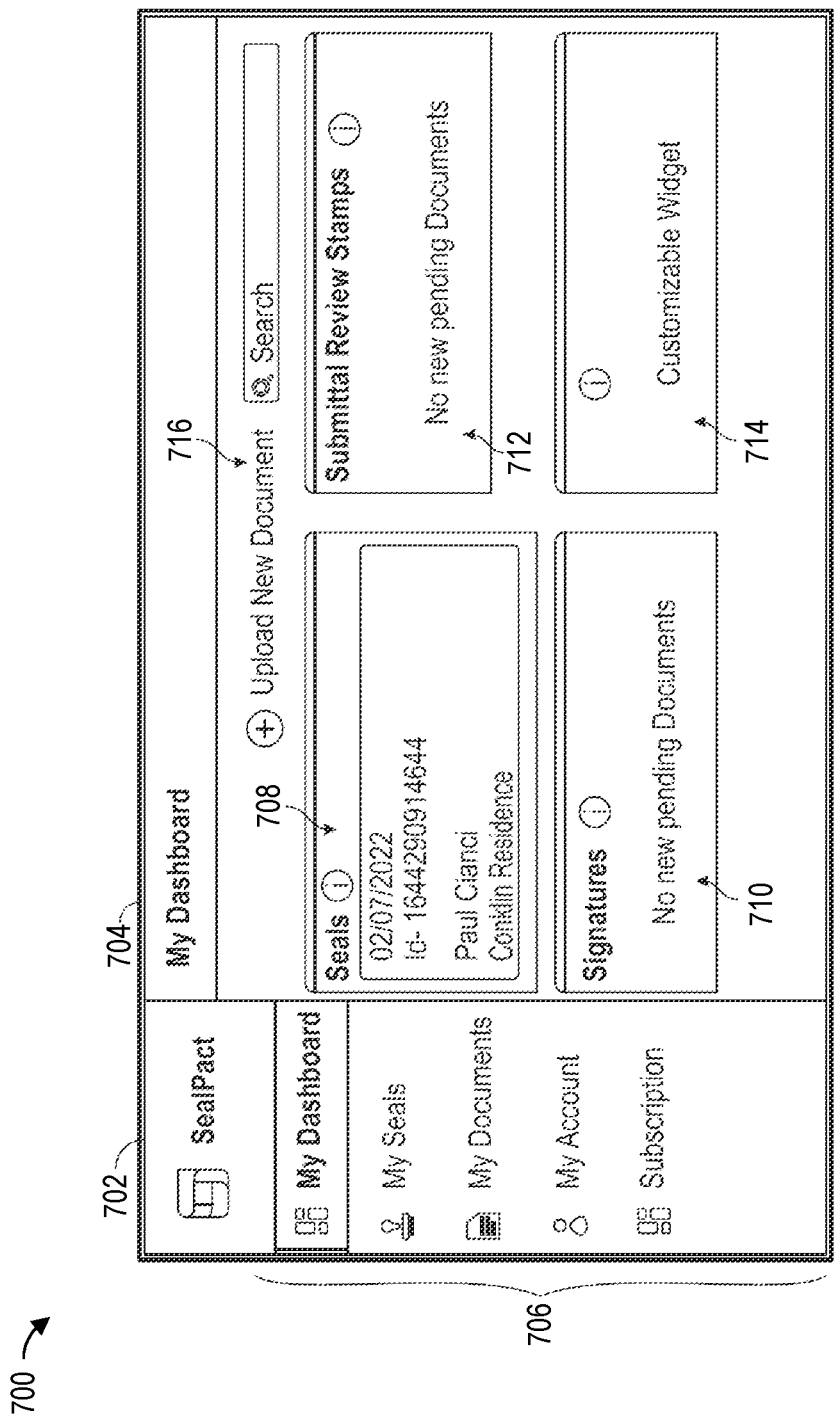
FIG. 7 illustrates a user interface for managing dynamically validated, multi-level signature seals and multi-level digital signature validation portals according to one or more embodiments.

FIG. 7 illustrates a user interface 700 for managing dynamically validated, multi-level signature seals (e.g., seal 102) and multi-level digital signature validation portals (e.g., multi-level digital signature validation portal 300) according to one or more embodiments. As shown in FIG. 7, the user interface 700 (also referred to as a website or web portal) includes a navigation bar 702 and a dashboard 704 (here, "My Dashboard").

In some embodiments, the navigation bar 702 includes one or more selectable fields 706 (here, "My Dashboard", "My Seals", "My Documents", "My Account", "Subscription".). In some embodiments, clicking or otherwise selecting a field of the one or more selectable fields 706 redirects the dashboard 704 to content associated with the respective field. For example, in FIG. 7 "My Dashboard" has been selected and the dashboard 704 now displays information associated with "My Dashboard", such as a seal widget 708 including a list of managed seals for the respective user of the user interface 700. The information can be displayed via widgets, popups, and/or windows within the user interface 700.

In some embodiments, "My Dashboard" serves as a landing page for the user interface 700 that offers a high-level overview of the various seals and associated documents for the respective user. The exact type and scope of the data presented in "My Dashboard" is not meant to be particularly limited, but could further include, for example, a signatures widget 710, a stamps widget 712, and a customizable widget 714.

In some embodiments, the signatures widget 710 includes a list of managed signatures for the respective user of the user interface 700. In some embodiments, the stamps widget 710 includes a list of managed stamps for the respective user of the user interface. In some embodiments, the customizable widget 710 can be customized by a user of the user interface 700 to include any available information (e.g., a count of managed seals/stamps/signatures for the user, a list of associated documents, contract or liability information, etc.). In some embodiments, "My Dashboard" further includes a navigation widget 716 configured for uploading and searching documents (e.g., document 100 having seal 102).

FIG. 8 illustrates an exemplary selectable field 802 of the user interface 700 according to one or more embodiments. As shown in FIG. 8, the selectable field 802 (here, "My Documents") has been selected and the dashboard 704 now displays information associated with "My Documents", such as a document widget 804. While not meant to be particularly limited, the document widget 804 can include various informational fields for one or more documents managed using the user interface 700. For example, the document widget 804 includes fields for "Signer Name", "Type", "Project Number", "Project Address", "Project Name", and "Date Uploaded". It should be understood that other informational fields are possible. The various informational fields of the document widget 804 can be selected to sort (alpha-numerically, ascending or descending, etc.) the associated documents, seals, and stamps managed using the user interface 700. Other widgets are possible. For example, managers can use a signer widget 806 to quickly change (via, e.g., a pulldown menu) between various signers, causing the user interface 700 to display the seals, stamps, and documents associated with the selected signer.

In some embodiments, selecting any line within the document widget 804 causes the dashboard 704 to navigate to the associated document. For example, selecting the line 808 causes the dashboard 704 to navigate to the document 100 (shown in FIG. 1). An example document navigation is shown in FIG. 9A.

FIGS. 9A, 9B, and 9C illustrate the dashboard 704 after selecting a document 902 from the document widget 804 according to one or more embodiments. As shown in FIG. 9A, the dashboard 704 shows a page 904 (here, an example title page) of the document 902 having thereon a seal 906. As further shown in FIG. 9A, the dashboard 704 now includes a navigation widget 908.

The navigation widget 908 can include various tools for navigating the document 902. As shown, the navigation widget 908 includes a download button that upon selection, allows the user to download a local copy of the document 902, a page count indicator, and various page navigation buttons (e.g., page up/down buttons, move, zoom and rotate buttons, etc.).

The navigation widget 908 further includes a validation widget 910, a seal status widget 912, and a scans widget 914. The validation widget 910 can be selected by the user to manually validate seals and to manually invalidate previously valid seals. The seal status widget 912 displays the current validation status for the respective document seal (here, the validation status for the seal 906 on the document 902). The scans widget 914, upon selection, directs a user to a "Scan Details" page that allows the user to review a list of entities (other users, customers, contractors, companies, etc.) that have verified the seal 906 (or other seals, refer to "My Seals"). Scan detail functionality, including selection of the scans widget 914 and the Scan Details page are discussed in greater detail with respect to FIG. 10.

FIG. 9A illustrates an example scenario where the seal 906 is currently valid (sealed, stamped, etc.). Accordingly, the validation widget 910 displays an option to "Invalidate" the seal 906 and the seal status widget 912 indicates "Seal-Pacted" (or alternatively, any other language to positively affirm that the seal is valid, such as, for example, "Valid", "Sealed", "Signed", "Stamped", etc.).

In some embodiments, the validation widget 910 is only shown to users having authority to change the seal status for the respective document. For example, the validation widget 910 can be shown only when the currently logged in user within the user interface 700 is the signer for the respective document. Permissions can be managed using any suitable technique, such as, for example via permissions tied to individual accounts assigned to each signer or user of the user interface 700. These accounts can be secured via logins and passwords, 2-factor authentication, etc. In any case, for users that do not have signer permissions, the dashboard 704 can be configured to only display the seal status widget 912.

FIG. 9B illustrates an example scenario where the seal 906 shown in FIG. 9A needs to be invalidated. As shown in FIG. 9B, the validation widget 910 can include a pulldown menu with various reasons or explanations to "Invalidate" the seal 906. While the options shown in FIG. 9B are illustrative only and are not meant to be particularly limited, such options can include, for example, "Updates/Revisions to Deliverable", "Updates/Revisions to SealPact information", "Design Professional and Client have Terminated Relationship", "Other", etc.

FIG. 9C illustrates an example scenario where the seal 906 shown in FIG. 9A has been invalidated. As shown in FIG. 9C, the validation widget 910 now displays "Re-SealPact" (or alternatively, any other language to positively affirm that the seal can be re-validated, such as, for example, "Validate", "Seal", "Re-seal", "Sign", "Re-sign", "Stamp", "Revalidate", etc.). Moreover, the seal status widget 912 now indicates "Invalidated" (or alternatively, any other language to positively affirm that the seal is now invalid, such as, for example, "Invalid", "Not Sealed", "Not Signed", "Stamp Revoked", etc.).

Figure 10:
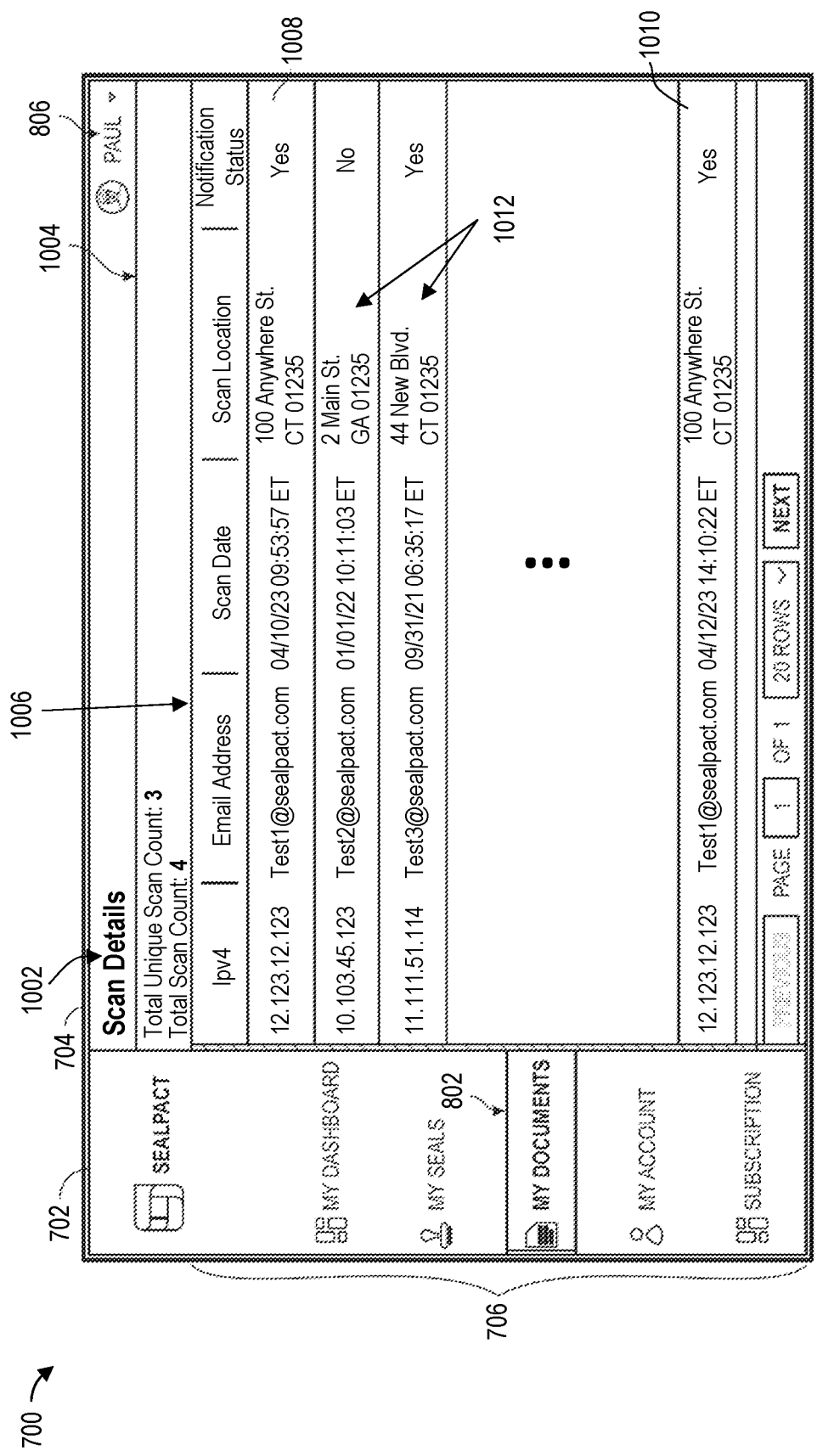
FIG. 10 illustrates an exemplary dashboard after selecting the scans detail widget in the user interface according to one or more embodiments.

FIG. 10 illustrates the dashboard 704 after selecting the scans widget 914 in the navigation widget 908 according to one or more embodiments. As shown in FIG. 10, the dashboard 704 shows a Scan Details page 1002. The Scan Details page 1002 can include a scan count widget 1004. The scan count widget 1004 can depict, for example, a total number of unique scans (here "3") and/or a total number of scans, including unique and/or duplicate entities (here, "4"), of the seal 906. In this manner, a user can quickly determine how many times (and by how many entities) the seal 906 has been scanned for validation. Moreover, by checking the Scan Details page 1002, a user can quickly see who has verified their seals (and who has access to the respective documents), whether the seals were accessed via clicking a digital copy of the seal (e.g., the link 110 of FIG. 1), or scanning the QR Code of the seal (e.g., the machine-readable code 108 of FIG. 1) to enter a verification portal (e.g., the validation portal 200 in FIGS. 2A and 2B).

As further shown in FIG. 10, the dashboard 704 now includes an informational view 1006. The informational view 1006 displays information associated with the scan history of the seal 906 of the respective user. While not meant to be particularly limited, the informational view 1006 can include one or more informational fields. For example, the informational view 1006 shown in FIG. 10 includes fields for "Ipv4", "Email Address", "Scan Date", "Scan Location", and "Notification Status". It should be understood that other informational fields are possible. In some embodiments, the various informational fields of the informational view 1006 can be used to sort the respective details alphanumerically (ascending and/or descending, as desired).

An example scan details entry 1008 includes an Ipv4 address (here, "12.123.12.123"), an email address (here, "Test1@sealpact.com"), a scan date (here, "04/10/23 09:53:57 ET"), a scan location (here, "100 Anywhere St., CT 01235"), and a subscription status (here, "YES"). Observe that a second entry 1010 includes details for the same entity (e.g., the same Ipv4 and email addresses, the same scan location, etc.). Observe further that additional entries 1012 include details for other unique entities (e.g., different Ipv4 and email addresses, different scan locations, etc.).

In some embodiments, the "Notification Status" field is a dynamic field that allows a user to select a notification option (i.e., Yes or No). In some embodiments, setting the Notification Status field to "Yes" for a respective entry will configure the dashboard 704 and/or the underlying system to provide the user with notification updates (via email or otherwise) if the original signer (conveyor of the attestation) changes the status of the digital signature (i.e. invalidates, re-seals, re-validates, etc. the document).

Figure 11:
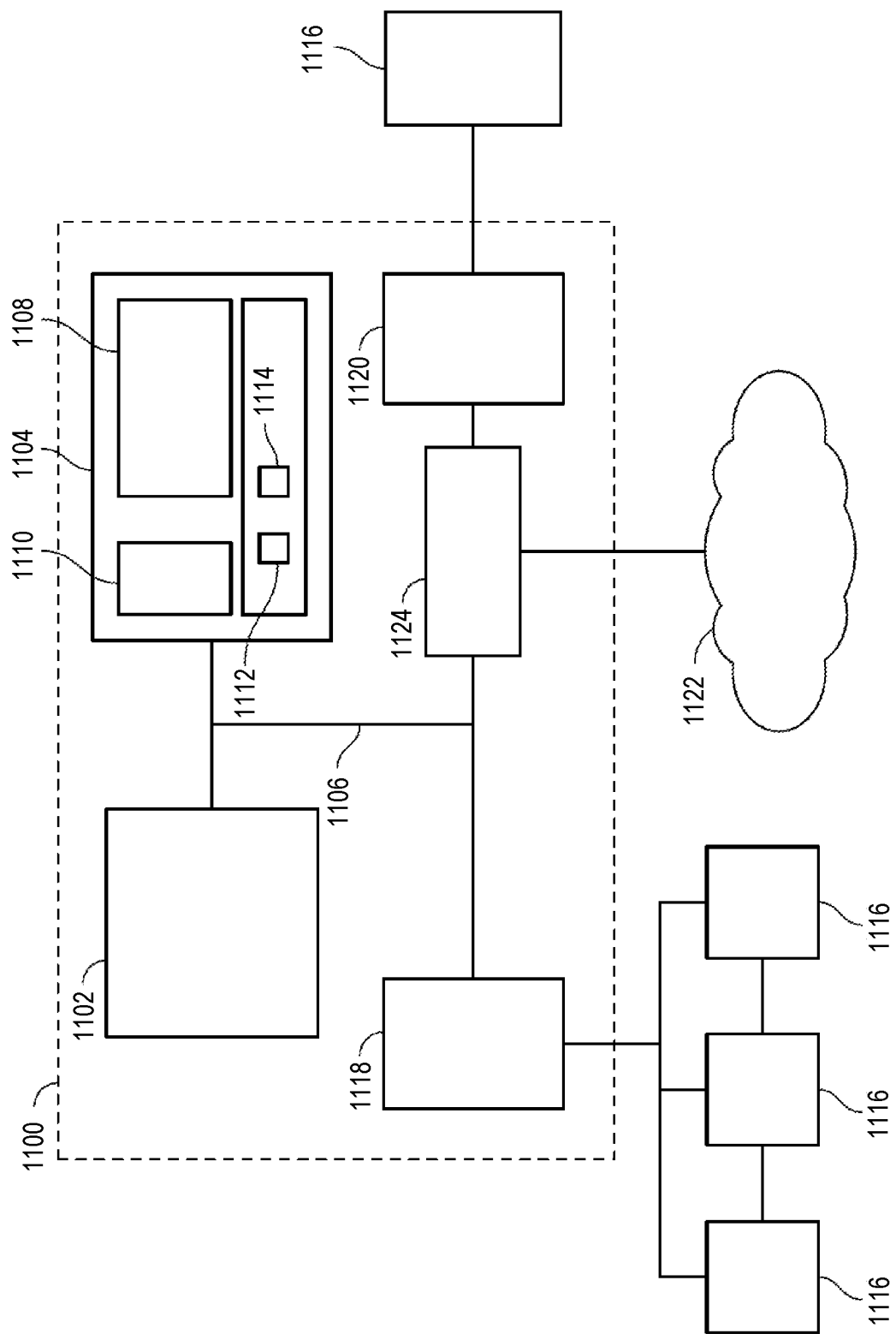
FIG. 11 is a computer system according to one or more embodiments.

FIG. 11 illustrates aspects of an embodiment of a computer system 1100 that can perform various aspects of embodiments described herein. The computer system 1100 includes at least one processing device 1102, which generally includes one or more processors for performing aspects of methods described herein.

Components of the computer system 1100 include the processing device 1102 (such as one or more processors or processing units), a memory 1104, and a bus 1106 that couples various system components including the system memory 1104 to the processing device 1102. The system memory 1104 may include a variety of computer system readable media. Such media can be any available media that is accessible by the processing device 1102, and includes both volatile and non-volatile media, and removable and non-removable media.

For example, the system memory 1104 includes a non-volatile memory 1108 such as a hard drive, and may also include a volatile memory 1110, such as random access memory (RAM) and/or cache memory. The computer system 1100 can further include other removable/non-removable, volatile/non-volatile computer system storage media.

The system memory 1104 can include at least one program product having a set (e.g., at least one) of program modules that are configured to carry out functions of the embodiments described herein. For example, the system memory 1104 stores various program modules that generally carry out the functions and/or methodologies of embodiments described herein. A module or modules 1112, 1114 may be included to perform functions related to the seal 102, validation portal 200, user interface 700, etc., such as, for example, validating, invalidating, or re-validating the seal 102, adding, removing, or amending any of the static or dynamic multi-level signature data, etc. The system 1100 is not so limited, as other modules may be included depending on the functionality required for a respective application. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 1102 can also be configured to communicate with one or more external devices 1116 such as, for example, a keyboard, a pointing device, and/or any devices (e.g., a smartphone, a laptop, a stylus, etc.) that enable the processing device 1102 to communicate with one or more other computing devices. Communication with various devices can occur via Input/Output (I/O) interfaces 1118 and 1120.

The processing device 1102 may also communicate with one or more networks 1122 such as a local area network (LAN), a general wide area network (WAN), a bus network and/or a public network (e.g., the Internet) via a network adapter 1124. In some embodiments, the network adapter 1124 is or includes an optical network adaptor for communication over an optical network or near-field communication (NFC). It should be understood that although not shown, other hardware and/or software components may be used in conjunction with the computer system 1100. Examples include, but are not limited to: microcode, device drivers, redundant processing units, external disk drive arrays, RAID systems, and data archival storage systems, etc.

Referring now to FIG. 12, a flowchart 1200 for leveraging a digital signature system having dynamically validated, multi-level signature seals is generally shown according to an embodiment. The flowchart 1200 is described in reference to FIGS. 1-11 and may include additional steps not depicted in FIG. 12. Although depicted in a particular order, the blocks depicted in FIG. 12 can be rearranged, subdivided, and/or combined.

As shown in block 1202, the method includes providing a multi-level signature seal. In some embodiments, the multi-level signature seal is an attestation made on a document by a conveyor. The attestation can include, for example, a seal, stamp, or certification made by an authorized person(s) (e.g., a notary, a designated signor, etc.). In some embodiments, the document and attestation are digital facsimiles of physical documents and attestations (e.g., a stamp, seal, etc.).

In some embodiments, the multi-level signature seal includes machine-readable code configured to direct a user, upon scanning or selecting the machine-readable code, to a validation portal for the attestation. In some embodiments, the machine-readable code can be configured to direct the user, upon scanning or selecting the machine-readable code, to multi-level digital signature data for the attestation. In some embodiments, the multi-level digital signature data includes an artifact configured to graphically indicate the validation status of the respective attestation (e.g., seal). In some embodiments, the multi-level digital signature data includes static information that is available in the document, static information that is not available in the document, and dynamic information that is not available in the document (sometimes collectively referred to as multi-level validation data).

As shown in block 1204, the method includes providing the validation portal. In some embodiments, the validation portal includes an artifact graphically indicating a current validation status of the attestation. In some embodiments, the validation portal includes a validation link configured to direct the user, upon selection, to multi-level signature data for the respective seal. In some embodiments, the multi-level signature data includes static information that is available in the document, static information that is not available in the document, and dynamic information that is not available in the document.

providing a user dashboard configured to allow the conveyor to manually validate and invalidate the attestation, the user dashboard comprising a scans widget that, upon selection, directs the user to a scan details informational view.

As shown in block 1206, the method includes, providing a user dashboard configured to allow the conveyor to manually validate and invalidate the attestation, the user dashboard comprising a scans widget that, upon selection, directs the user to a scan details informational view. In some embodiments, the scan details informational view includes a scan count widget depicting at least one of a total number of unique scans of the multi-level signature seal and a total number of scans of the multi-level signature seal.

In some embodiments, the scan details informational view includes a list of entities that have verified the attestation of the multi-level signature seal.

In some embodiments, the scan details informational view further includes one or more of location information and contact information for each respective entity on the list of entities.

In some embodiments, the scan details informational view further includes one or more of a scan date and a scan location for each respective entity on the list of entities.

In some embodiments, the scan details informational view further includes a notification status field. In some embodiments, the notification status field is a dynamic field that allows a user to choose a notification option. In some embodiments, selection of a first (e.g., "YES") notification option causes the digital signature system to provide the user with notification updates. In some embodiments, the user designates a predetermined contact method for such notifications, such as, for example, a phone number and/or an email address. In some embodiments, a notification is provided to the user (upon indicating a desired for notifications) if the original signer (conveyor of the attestation) changes the status of the digital signature (i.e. invalidates, re-seals, re-validates, etc. the document).

The method can further include receiving credentials showing that the user is the conveyor. For example, the user can login to a credentialing system using a known account name and password, via a private key, etc.

The method can further include receiving, from the user (after authentication), a manual invalidation of the attestation from the user interface of the user device. In some embodiments, the user manually invalidates the seal/attestation via a user interface configured to display the multi-level digital signature data. In some embodiments, the user can select a reason for invalidating the attestation from a dropdown in the user interface. In some embodiments, the user can manually revalidate the attestation via the user interface. In some embodiments, the user can select a reason for re-validating the attestation from a dropdown in the user interface.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A computer system including one or more processors, a memory, and a bus that couples the one or more processors including the memory to each other, the memory stores one or programs to define a digital signature system comprising:
   a multi-level signature seal comprising:
   an attestation for a document made by a conveyor; and
   machine-readable code configured to direct a user, upon scanning or selecting the machine-readable code, to a validation portal for the attestation;
   the validation portal comprising:
   an artifact graphically indicating a current validation status of the attestation; and
   a validation link configured to direct the user, upon selection, to multi-level signature data comprising static information that is available in the document, static information that is not available in the document, and dynamic information that is not available in the document; and
   a user dashboard configured to allow the conveyor to manually validate and invalidate the attestation, the user dashboard comprising a scans widget that, upon selection, directs the user to a scan details informational view.

2. The computer system of claim 1, wherein the scan details informational view comprises a scan count widget depicting at least one of a total number of unique scans of the multi-level signature seal and a total number of scans of the multi-level signature seal.

3. The computer system of claim 1, wherein the scan details informational view comprises a list of entities that have verified the attestation of the multi-level signature seal.

4. The computer system of claim 3, wherein the scan details informational view further comprises one or more of location information and contact information for each respective entity on the list of entities.

5. The computer system of claim 3, wherein the scan details informational view further comprises one or more of a scan date and a scan location for each respective entity on the list of entities.

6. The computer system of claim 3, wherein the scan details informational view further comprises a notification status field.

7. The computer system of claim 6, wherein the notification status field comprises a dynamic field that allows a user to choose a notification option.

8. The computer system of claim 6, wherein, upon selection of a first notification option, the digital signature system provides the user with a notification update, using a predetermined contact method, if the conveyor changes a seal status of the document.

9. The computer system of claim 1, wherein the attestation comprises at least one of a seal, a stamp, and a certification made on authority of the conveyor.

10. The computer system of claim 1, wherein the machine-readable code comprises a barcode or quick response (QR) code.

11. A method for a digital signature system, the method comprising:
   providing a multi-level signature seal comprising:
   an attestation for a document made by a conveyor; and
   machine-readable code configured to direct a user, upon scanning or selecting the machine-readable code, to a validation portal for the attestation;
   providing the validation portal comprising:
   an artifact graphically indicating a current validation status of the attestation; and
   a validation link configured to direct the user, upon selection, to multi-level signature data comprising static information that is available in the document, static information that is not available in the document, and dynamic information that is not available in the document; and
   providing a user dashboard configured to allow the conveyor to manually validate and invalidate the attestation, the user dashboard comprising a scans widget that, upon selection, directs the user to a scan details informational view.

12. The method of claim 11, wherein the scan details informational view comprises a scan count widget depicting at least one of a total number of unique scans of the multi-level signature seal and a total number of scans of the multi-level signature seal.

13. The method of claim 11, wherein the scan details informational view comprises a list of entities that have verified the attestation of the multi-level signature seal.

14. The method of claim 13, wherein the scan details informational view further comprises one or more of location information and contact information for each respective entity on the list of entities.

15. The method of claim 13, wherein the scan details informational view further comprises one or more of a scan date and a scan location for each respective entity on the list of entities.

16. The method of claim 13, wherein the scan details informational view further comprises a notification status field.

17. The method of claim 16, wherein the notification status field comprises a dynamic field that allows a user to choose a notification option.

18. The method of claim 16, wherein, upon selection of a first notification option, the digital signature system provides the user with a notification update, using a predetermined contact method, if the conveyor changes a seal status of the document.

19. The method of claim 11, wherein the attestation comprises at least one of a seal, a stamp, and a certification made on authority of the conveyor.

20. The method of claim 11, wherein the machine-readable code comprises a barcode or quick response (QR) code.

* * * * *